United States Patent Office 3,278,276
Patented Oct. 11, 1966

3,278,276
INCREASING THE BULK DENSITY OF SODIUM PERBORATE TETRAHYDRATE BY MIXING WITH MOLTEN PERBORATE
Ludwig Pellens and Helmut Honig, Bad Honningen (Rhine), and Wilhelm Moser, Ariendorf, Germany, assignors to Kali-Chemie Aktiengesellschaft, Hannover, Germany, a firm
No Drawing. Filed Sept. 4, 1962, Ser. No. 221,303
Claims priority, application Germany, Sept. 7, 1961, K 44,650
6 Claims. (Cl. 23—313)

The consumers of sodium perborate tetrahydrate ($NaBO_3 \cdot 4H_2O$) accept recently to a steadily increasing extent this product only if it is of coarse grain which trickles well, is as much as possible free from dust, and has a constant bulk weight. In order to meet these requirements, in the course of manufacture of this product as much as possible working conditions are selected which result either in the formation of large single crystals or in the formation of conglomerated crystals spherically grown together. The dust formed thereby, is removed by sifting. However, in many cases due to the working conditions, products having the shape of little stars, prisms or little columns, or even finely crystalline products are obtained, which have many disadvantages. Such crystal structures are not resistant to abrasion. They become split during transport and storage so that the amount of dust increases and the bulk weight changes constantly. The non-spherical crystal structures have low trickling characteristics, which are further impaired by the increasing dust content.

Furthermore, in some cases a sodium perborate tetrahydrate having an increased bulk weight is wanted by consumers, for example if large quantities of perborate must be stored for extended periods of time and the storage space must be kept as small as possible, by increasing the bulk weight. In the case of oversea transports, considerable savings can be likewise attained by increasing the bulk weight, whereby expenses for packaging and loading space can be reduced to a minimum.

It has now been found that the dust-containing sodium perborate product can be converted into practically dust-free material and simultaneously the bulk weight can be considerably increased without affecting the content in active oxygen. This can be attained by filling the interstices and cracks which are present in the conglomerates of crystals in products manufactured by conventional processes, with molten perborate. Thereby the bulky surface of the crystals is smoothed and simultaneously the dust-like particles are cemented together. In order to attain this, the perborate obtained by conventional manufacture is mixed with a small amount of molten perborate with simultaneous cooling, whereby the temperature of the mixed material should not exceed 47° C. Immediately after mixing, the crystal water of the perborate, which has been partially lost during melting, is supplemented by spraying water onto the still warm mixture and subsequent cooling to room temperature. If desired, instead of water, a stabilizer-suspension can be sprayed. However normally the perborate used is already sufficiently stabilized. In order to prevent too strong increase of the temperature upon addition of the melt, it can be advisable to add the melt in portions gradually and to extract part of the heat by cooling in the intervals.

According to a modified process, conventional $NaBO_3 \cdot 4H_2O$ is heated under stirring or kneading in an open or closed vessel which is not under pressure, up to partial melting, but not higher than 47° C., and subsequently spraying with water is applied.

Instead of substituting the lost water by spraying, to the mixed material, after mixing, moist perborate from the centrifuge can be added in an amount which is equivalent to the lost water.

By the after-treatment according to the invention, of the normal or conventional perborate, the following improvements are obtained:

(1) Elimination of the dust-like material, even if it is present in an amount of 20 or 30% in the starting material.

(2) The crystal conglomerates become, due to the filling of the hollow spaces in the crystal, more similar to the spherical shape and more resistant to abrasion.

(3) The flowing capacity is increased due to the elimination of the dust particles and limitation of bulky crystal structures.

(4) Increases of the bulk weight to about 0.9 kg./l., which practically does not change during handling and storing of the perborate.

The following examples illustrate some specific embodiments of and best modes for carrying out the invention to which the invention is not limited.

*Example 1*

50 kg. of coarse grain sodium perborate tetrahydrate (which is herein sometimes briefly called "perborate") having a bulk weight of 0.7 kg./l. are treated in a mixer which consists of a $V_2A$-product—for example a Pfleiderer or Drais mixer—by pouring over it 10 kg. perborate molten at 64° C. and vigorously mixing these products with each other under simultaneous cooling. Thereby 42° C. was observed as the maximum temperature of the mixed product. Subsequently about 400–600 ml. of water are sprayed onto the mixture, which is then allowed to cool up to about 30° C. under stirring. The product is then discharged, transported and packaged and thereby a further cooling to room temperature takes place. A small amount of oversized grain can be removed by screening.

The characteristics of the starting material and of the product obtained in this example are shown in the following table:

|  | Starting Material | Finished Material |
|---|---|---|
| Bulk weight _____kg./l__ | 0.71 | 0.87 |
| Active Oxygen _____percent__ | 10.16 | 10.12 |
| Grain Size: | | |
| 0.5 mm _____do____ | 10.5 | 10.2 |
| 0.1–0.5 mm _____do____ | 87.2 | 89.2 |
| 0–0.1 mm _____do____ | 2.3 | 0.6 |

*Example 2*

40 kg. coarse grain perborate are vigorously stirred in a mixer which is heated by hot water until the perborate molten on the walls yields with the product charged a moist mass and the temperature of the mixed product amounts to 47° C. Heating is then stopped and cooling is started. Simultaneously 600 ml. of water are added through a nozzle and mixing is continued until the mixture has assumed a dry appearance, i.e. a temperature of 30–33° C. The resulting product contains only a little amount of dust; it shows satisfactory trickling and is heavier than the starting material. Its characteristics are shown in the following table:

|  | Starting Material | Finished Material |
|---|---|---|
| Bulk weight _____kg./l__ | 0.71 | 0.83 |
| Active Oxygen _____percent__ | 10.12 | 10.12 |
| Grain Size: | | |
| 0.5 mm _____do____ | 20.1 | 29.4 |
| 0.1–0.5 mm _____do____ | 72.1 | 69.3 |
| 0–0.1 mm _____do____ | 7.8 | 1.3 |

Example 3

40 kg. of medium size grain perborate containing 21% dust-like particles are intimately mixed in the manner described in the above Example 1 with 10 kg. of perborate melt. Instead of water, 12 kg. of moist perborate, from the centrifuge, containing 3.5% adhering water, are added, whereby temperature of the mixed material is immediately reduced from about 45 to 35° C. The resulting product which is packaged without any additional drying, contains a little amount of dust, shows satisfactory trickling and has a high bulk weight, as shown by the following table:

|  | Starting Material | Finished Material |
|---|---|---|
| Bulk weight _____ kg./l__ | 0.74 | 0.84 |
| Active Oxygen _____ percent__ | 10.32 | 10.28 |
| Grain Size: |  |  |
| 0.5 mm _____ do____ | 18.5 | 21.0 |
| 0.1–0.5 mm _____ do____ | 60.5 | 76.5 |
| 0–0.1 mm _____ do____ | 21.0 | 2.5 |

Example 4

50 kg. medium grain size perborate are intimately mixed under cooling in the manner described in the above Example 1, with 7.5 kg. of molten perborate, so that the maximum temperature of the mixed material is about 40° C. 500 ml. of water are sprayed onto said mixed material. After cooling in the mixer a perborate is obtained which contains little dust, trickles well and has the following characteristics:

|  | Starting Material | Finished Material |
|---|---|---|
| Bulk Weight _____ kg./l__ | 0.75 | 0.85 |
| Active Oxygen _____ percent__ | 10.18 | 10.12 |
| Grain Size: |  |  |
| 0.5 mm _____ do____ | 4.5 | 20.6 |
| 0.1–0.5 mm _____ do____ | 78.0 | 79.0 |
| 0–0.1 mm _____ do____ | 17.5 | 0.4 |

Example 5

40 kg. of a perborate which has a very bulky crystal structure having the shape of little stars and a low bulk weight of 0.5 kg./l. are intimately mixed in a mixer with 8 kg. of molten perborate, care being taken by cooling that the temperature of the mixed material does not exceed 40° C. Onto the mixture 400 ml. of water is sprayed. After cooling a product is obtained, which contains little dust-like particles, trickles well, is resistant to abrasion, has a normal bulk weight of 0.68 kg./l., and the following characteristics:

|  | Starting Material | Finished Material |
|---|---|---|
| Bulk weight _____ kg./l__ | 0.50 | 0.68 |
| Active oxygen _____ percent__ | 10.28 | 10.24 |
| Grain size: |  |  |
| 0.5 mm _____ do____ | 16.0 | 15.8 |
| 0.1–0.5 mm _____ do____ | 74.4 | 80.7 |
| 0–0.1 mm _____ do____ | 9.6 | 3.5 |

Example 6

In this example a perborate is used, the crystals of which consist of individual, or grown together, long, thin prisms and has a very low bulk weight of 0.36 kg./l. Such a product does not flow, and often dams up to steep walls which collapse occasionally. By mixing 25 kg. of such a perborate with 7.5 kg. of molten perborate and proceeding otherwise at a temperature of 46° C. of the mixed material, in the manner described in the above Example 5, a product results which flows unobjectionably, is considerably more resistant to abrasion, contains little dust-like particles and the bulk weight of which is almost doubled. The characteristics are as follows:

|  | Starting Material | Finished Material |
|---|---|---|
| Bulk weight _____ kg./l__ | 0.36 | 0.67 |
| Active oxygen _____ percent__ | 10.24 | 10.22 |
| Grain Size: |  |  |
| 0.5 mm _____ do____ | 5.0 | 8.2 |
| 0.1–0.5 mm _____ do____ | 69.0 | 85.3 |
| 0–0.1 mm _____ do____ | 26.0 | 6.5 |

The parts and percent herein are by weight if not otherwise stated.

It will be understood from the above that the present invention is not limited to the details specifically described above and can be carried out with various modifications. Thus the amount of the molten perborate mixed with the solid perborate may vary within the range of about 10 to 30%, based on the weight of solid perborate and the amount of water sprayed onto the mixture of solid and molten perborate may be in the range of about 0.5 to 1.5%, based on the weight of the mixture of solid and molten perborate.

The stabilizing suspension mentioned above may consist of water, in which the equal amount of finely divided magnesium silicate is suspended. The symbol "$V_2A$" is used herein to denote a type of stainless steel containing 17 to 19% of chromium and 8.5 to 10% of nickel. The amount of molten perborate to be added to the solid perborate is in the range of 10 to 30% based on the weight of the solid perborate, and the amount of water to be sprayed onto the perborate mixture is in the range of 0.5 to 1.5%, based on the weight of said mixture. The amount of water to be sprayed onto the perborate heated to partial melting, should be in the range of 0.5 to 1.5%, based on the weight of said perborate.

We claim:

1. Process for improving the grain characteristics and increasing the bulk weight of sodium perborate tetrahydrate to at least about 0.67 kg. per liter, comprising mixing solid sodium perborate tetrahydrate at a temperature not exceeding 47° C. while simultaneously stirring and cooling with a small amount of molten sodium perborate tetrahydrate in order to form a mixture, maintaining temperatures not exceeding 47° C., and spraying onto said mixture, immediately after mixing, water in an amount substantially equal to that of the crystal water of sodium perborate tetrahydrate, lost during said mixing and subsequently cooling the sprayed mixture to room temperature.

2. A process as claimed in claim 1, in which said amount of water is sprayed onto the mixture in the form of an aqueous suspension of a stabilizer for sodium perborate tetrahydrate.

3. A process as claimed in claim 1, in which the molten sodium perborate tetrahydrate is added to the solid perborate in several individual portions in a stepwise manner and heat introduced by the molten perborate into the mixture is withdrawn between additions.

4. A process as claimed in claim 1, in which the amount of molten perborate mixed with the solid perborate is in the range of about 10 to 30% based on the weight of the solid perborate.

5. A process as claimed in claim 4, in which the amount of the water sprayed onto the mixture is in the range of about 0.5 to 1.5% based on the weight of the mixture of solid and molten perborate.

6. Process for improving the grain characteristics and increasing the bulk weight of sodium perborate tetrahydrate by mixing solid and molten perborate, comprising heating solid sodium perborate tetrahydrate under stirring and kneading up to a maximum of 47° C. until partial melting occurs and spraying onto the mixture of solid and molten perborate, immediately after mixing, water and subsequently cooling the sprayed mixture.

References Cited by the Examiner
UNITED STATES PATENTS
2,436,766 2/1948 Davis _____ 23—313 X
2,706,178 4/1955 Young _____ 23—60

FOREIGN PATENTS
1,064,485 9/1959 Germany.

NORMAN YUDKOFF, *Primary Examiner.*
S. J. EMERY, A. J. ADAMCIK, *Assistant Examiners.*